Jan. 20, 1925.
J. LAUTERBACH
FISHING REEL
Filed Oct. 6, 1921
1,523,983
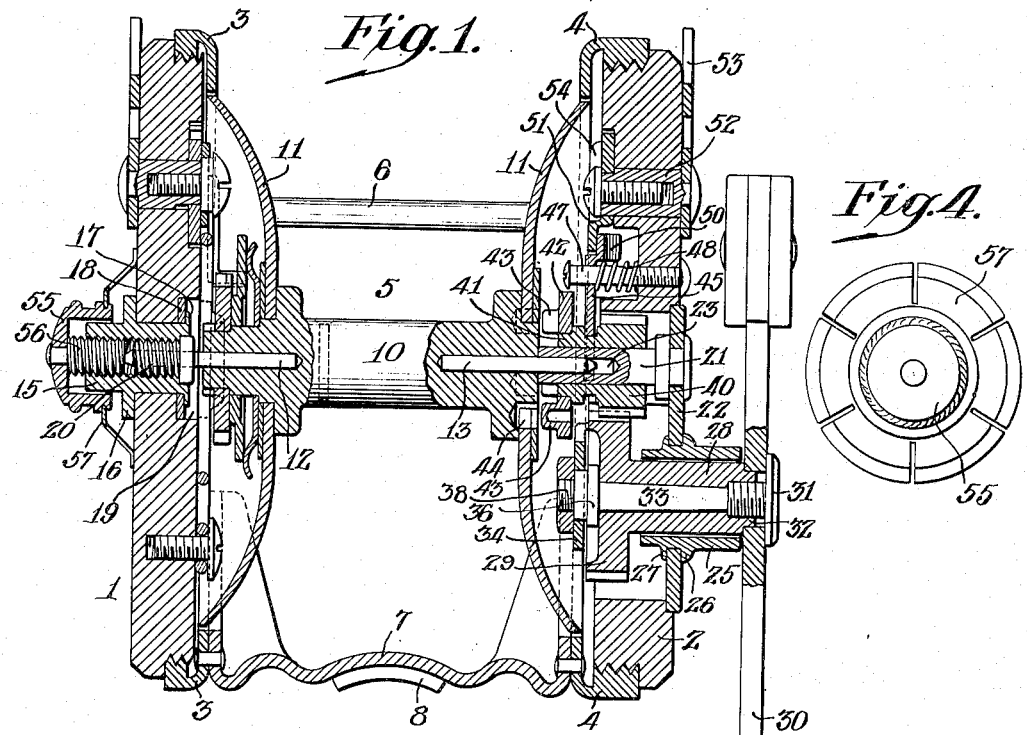
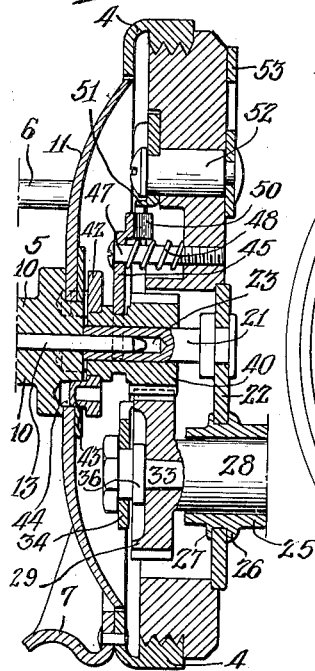
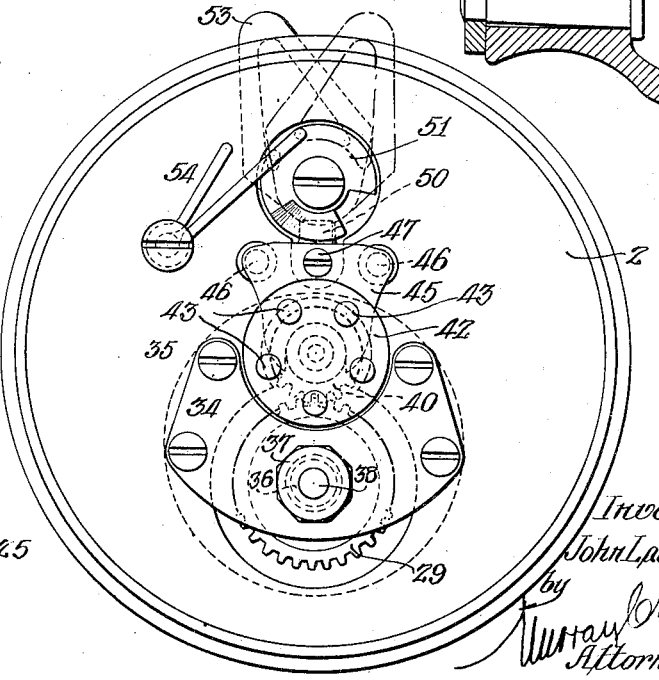
Inventor
John Lauterbach
by Murray Boyer
Attorney Patented Jan. 20, 1925.

1,523,983

UNITED STATES PATENT OFFICE.

JOHN LAUTERBACH, OF PHILADELPHIA, PENNSYLVANIA, ASSIGNOR TO OCEAN CITY MANUFACTURING CO., OF PHILADELPHIA, PENNSYLVANIA, A CORPORATION OF PENNSYLVANIA.

FISHING REEL.

Application filed October 6, 1921. Serial No. 505,751.

*To all whom it may concern:*

Be it known that I, JOHN LAUTERBACH, a citizen of Austria (having declared my intention of becoming a citizen of the United States), and a resident of Philadelphia, Pennsylvania, have invented certain new and useful Improvements in Fishing Reels, of which the following is a specification.

My invention comprises certain combinations of mechanism, and relates more particularly to the clutching means designed to connect and to means for actuating said clutching means to disconnect the gear wheels and the reel-spool around which a fish-line is wound. My invention also relates to the construction of the spool-casing or frame and the arrangement of the gearing an its shifting mechanism so as to occupy a narrow chamber of the reel between the spool and one of the head plates as hereinafter set forth;. all of such mechanism being carried by the head plate, and the clutching element cooperating with complemental means formed at the end of the reel-spool spindle. When the clutching mechanism is out of action the reel-spool may run free for casting purposes.

One object of my invention is to provide improved clutching mechanism between the reel-spool and the gearing actuated by the operating crank handle.

A further object of my invention is to provide simple means, operable exteriorly of one of the head plates for actuating the clutch mechanism in one direction; such clutch mechanism operating automatically in the opposite direction.

And a still further object of my invention is to provide a simple form of tension-applying means for the spindles or trunnions of the reel-spool in order that the latter may be held against endwise movement so as to run true in its bearings.

These and other features of my invention are more fully described hereinafter, reference being had to the accompanying drawings, in which:

Figure 1, is a sectional elevation of a fishing reel embodying my invention, showing the clutch mechanism for the reel-spool in the inactive position.

Fig. 2, is a detached sectional view of a portion of the structure shown in Figure 1, with the clutch mechanism in the active position.

Fig. 3, is a face view or elevation of the inner face of one of the head plates, showing a portion of the clutch mechanism and its operating parts, all of which are carried by said head plate independently of the balance of the reel structure, and Fig. 4, is a detached view illustrating a portion of the mechanism carried by the other head plate of the reel structure for applying end pressure to the trunnions of the reel-spool in order that it may run true in its bearings.

The reel structure constituting the subject of my present invention may comprise a frame made up of a pair of side walls or head plates 1 and 2, which may be in threaded engagement with housings 3 and 4, between which the reel-spool 5 is located; such housing being connected together by cross bars 6, and by a cross member 7, which includes feet 8, whereby the reel may be secured to the butt of a fishing rod.

The spool of the reel may comprise a central body or hub 10, with side flanges or plates 11; said central body or hub carrying at its ends spindles or trunnions 12 and 13, upon which it may turn in suitable bearings provided in or carried by the side walls or head plates of the reel structure.

In the side wall or head plate 1, I may mount a sleeve 15, having an external flange 16; the inner end of which sleeve may be riveted over at 17 against a bearing ring or plate 18, disposed in a recess 19, in said side wall. Threaded into the inner end of this sleeve 15 is plug 20, bored to receive the trunnion 12, of the reel-spool, and serving as a bearing therefor.

Supported by the head plate or wall 2, is a plug or gudgeon 21, which may be carried by a plate 22, suitably secured to said side wall externally of the same; the inner end of which plug 21 is centrally bored at 23, for the reception of the trunnion 13, of the reel-spool, and serving as a bearing therefor.

In addition, the plate 22, may carry a bearing sleeve 25, which may be secured to said plate by providing a shoulder 26 at one side of said plate and riveting over a portion of the sleeve at the opposite of said plate as indicated at 27, and this sleeve 25 receives the projecting hub 28, of a gear wheel 29. The hub of this gear wheel is secured to an externally disposed operating crank handle 30, by means of a screw 31, which enters said hub; the end of the latter being preferably squared at 32 to fit a similarly shaped opening in the crank handle.

The gear wheel 29, is supported by a tapered pin 33, upon which it may rotate; such pin being carried by a plate 34, which may be secured to the inner face of the head plate 2, by screws 35. In order that said pin 33 may be held to the plate 34, it is provided with a shoulder 36, interposed between the plate 34 and the gear wheel 29, such pin being secured in position with respect to said plate 34 by means of a suitable nut 37, engaging the reduced inner end 38 of said pin. As may be readily understood, such gear wheel is revoluble on the tapered pin 33, by turning the crank handle 30.

The gear wheel 29, is adapted to mesh with a broad faced pinion 40, journaled on the plug or gudgeon 21, receiving the trunnion 13, of the reel-spool. The pinion 40, is slidable upon this plug, and it has an extended hub 41, upon the end of which it carries a clutch member in the form of a disc plate 42, which may be provided with one or a series of projections 43, adapted to engage a recess or a series of recesses 44, formed in the end of the hub or body 10, of the reel-spool. When in such engagement, movement of the reel-spool is under control of the operating crank handle 30.

Adapted to engage the hub of the movable pinion 40; being provided with arms or prongs arranged to enter a groove formed in said hub, is a plate 45, suitably guided by a plurality of pins 46 and 47; the latter pin extending through said plate and being provided with a spring 48, whereby said plate may occupy the active or operative position illustrated in Fig. 2.

This plate 45, is provided with an angularly disposed projection 50, and arranged to engage this projection is a movable cam member 51, mounted on a stud or shaft 52, which is provided with an externally disposed rockable member 53, suitably secured to said stud or shaft; a spring arm 54, being employed to hold the cam member inactive when disengaged from the angular projection 50 of the clutch operating plate. The cam member is so arranged that such spring arm 54 will hold it against accidental movement when in the active or inactive positions.

Upon moving the externally disposed rockable member 53, the cam member 51 will be brought into engagement with the angular projection 50 of the clutch operating plate, as indicated in Figs. 1 and 3, and the clutch member 42 will be withdrawn, releasing its projections 43, from engagement with the recesses 44 in the end of the reel-spool body, and the reel-spool is then free to move in either direction, and is ready for casting purposes. It will be understood, of course, that these parts may be reversed, that is, the clutch plate 42 may be recessed, and the end of the reel-spool body 10 may be provided with projections to engage said recesses, without departing from the spirit of my invention.

In order to insure that the drum will run true in its bearings and avoid endwise movement, the sleeve member 15, of the head plate or side wall 1, may be provided with a cap piece 55, carrying an internal screw stem 56, in threaded engagement with said sleeve, and in addition, this cap member carries a tension element in the form of an arched slotted plate 57; the slotting thereof forming spring fingers, so that when the cap piece 55 turned, it will be held in the desired adjusted positions. The inner end of the internally disposed screw stem 56 is adapted to rest directly adjacent or lightly engage the end of the trunnion 12, which end may be reduced as indicated, and hold the same steady and free from endwise movement; thereby maintaining the reel-spool in a properly balanced position, whether running free or under the control of the crank handle 30.

Between the head plate or side wall 1, and one flange 11, of the reel-spool, the usual drag mechanism common to fishing reels is disposed, but as this forms no part of my present invention, it is not thought necessary to refer to same herein.

It will be noted that all of the clutch mechanism and the operating means therefor are carried by one of the head plates and that it may be removed intact by detaching said head plate from the housing portion of the reel-frame to which it is connected. One of the cooperating clutch elements is carried by said plate while the other is formed at the end of the reel-spool body. Should any part get out of order, it is a simple matter to remove the head plate and replace the desired part.

I claim:

1. The combination, in a fishing reel, of a pair of head plates, a reel-spool rotatably mounted between said head plates, a crank handle, gearing disposed between the crank handle and reel-spool whereby the latter may be turned by actuating said crank handle, a clutch member carried by a portion of said gearing for operative engagement with the reel-spool; said clutch member and its gear being slidably mounted on the axis of the reel spool, a plate having an angular projection operatively connected to said clutch member, a cam adapted for engagement with said angular projection to move said clutch member to and hold the same in inoperative position with respect to the reel-spool, a rocking member carried by one of the head plates for operating said cam to release said clutch member, and a spring for moving the clutch member into operative engagement with the reel-spool.

2. The combination, in a fishing reel, of a pair of head plates, a reel-spool rotatably mounted between said head plates, a crank handle, gearing disposed for operative connection with the reel-spool, said crank handle operating said gearing, a clutch member operatively connected with a portion of said gearing and adapted for operative engagement with the reel-spool, said clutch member being axially mounted with respect to the reel spool, a plate having an angular projection connected to said clutch member, a cam adapted for engagement with said angular projection to move said clutch member and normally hold the same inactive, means carried by one of the head plates for operating said cam member to release the clutch member, and means for effecting automatic engagement of said clutch member with the reel-spool.

3. The combination, in a fishing reel, of a frame comprising a pair of housings, removable head plates in engagement with said housings, plugs providing bearings carried by said head plates, a reel-spool, trunnions carried by said reel-spool adapted to said bearing plugs, means for holding the reel-spool against endwise movement, a crank handle, a pair of gears operatively disposed between the reel-spool and handle, a movable clutch member carried by one of said gears for operative engagement with the reel-spool; one of said members having a projection and the other member having a recess cooperating therewith, a plate having an angular projection operatively connected to said clutch member, a cam in engagement with said angular projection for holding said clutch member inactive, means for automatically moving the clutch member into operative position with respect to the reel-spool, and means externally disposed for operating said cam member.

4. The combination, in a fishing reel, of a frame comprising a pair of housings, removable head plates in engagement with said housings plugs providing bearings carried by said head plates, a reel-spool rotatably mounted in said frame, trunnions carried by said reel-spool adapted to said bearing plugs, a crank handle, a pair of gears operatively disposed between the reel-spool and handle, a clutch member carried by one of said gears for operative engagement with the reel-spool; said clutch member having a projection and the reel-spool having a recess cooperating therewith, a plate having an angular projection operatively connected to said clutch member, a cam in engagement with said angular projection for holding said clutch member inactive, a spring for moving the clutch member into operative position with respect to the reel-spool and means journaled in the head plate for operating said cam member.

In witness whereof I have signed this specification.

JOHN LAUTERBACH.